US011199288B1

(12) United States Patent
Alsager

(10) Patent No.: US 11,199,288 B1
(45) Date of Patent: Dec. 14, 2021

(54) BIG GAME STAND

(71) Applicant: Jan Alsager, Three Lakes, WI (US)

(72) Inventor: Jan Alsager, Three Lakes, WI (US)

( * ) Notice: Subject to any disclaimer, the term of this patent is extended or adjusted under 35 U.S.C. 154(b) by 33 days.

(21) Appl. No.: 16/870,527

(22) Filed: May 8, 2020

(51) Int. Cl.
*F16M 11/04* (2006.01)
*A01M 31/00* (2006.01)
*F16M 11/22* (2006.01)

(52) U.S. Cl.
CPC ............ *F16M 11/04* (2013.01); *A01M 31/00* (2013.01); *F16M 11/22* (2013.01)

(58) Field of Classification Search
USPC ........... 248/176.1, 187.1, 121; 211/196, 205, 211/203
See application file for complete search history.

(56) References Cited

U.S. PATENT DOCUMENTS

| | | | |
|---|---|---|---|
| 977,071 A * | 11/1910 | Crandall | |
| 1,083,027 A * | 12/1913 | Pancke | B43K 23/002 211/69.1 |
| 3,923,277 A * | 12/1975 | Perrault | H02G 3/0456 248/49 |
| 4,243,164 A | 1/1981 | Burlison et al. | |
| 4,317,257 A | 3/1982 | Engel | |
| 4,460,028 A | 7/1984 | Henry | |
| 4,828,307 A | 5/1989 | Sokol et al. | |
| 5,015,532 A | 5/1991 | Knight | |
| 5,472,765 A | 12/1995 | Green | |
| 5,569,071 A | 10/1996 | Metier et al. | |
| 6,135,333 A | 10/2000 | Tucker et al. | |
| 6,142,547 A | 11/2000 | Bowerman | |
| 6,296,559 B1 | 10/2001 | Kinnebrew | |
| 6,364,261 B1 | 4/2002 | Vass, Jr. | |
| 6,389,655 B2 | 5/2002 | Libecco | |
| 6,561,468 B2 | 5/2003 | Williamson | |
| 7,029,045 B2 | 4/2006 | Tumminaro | |
| 7,059,955 B2 | 6/2006 | Green et al. | |
| 8,336,855 B2 | 12/2012 | Griffiths | |
| 8,573,417 B1 * | 11/2013 | Anderson | D06F 53/045 211/119.01 |
| 8,616,601 B1 | 12/2013 | Coughlin et al. | |
| 9,248,696 B2 | 2/2016 | Maria et al. | |
| 9,962,990 B2 | 5/2018 | Russell | |
| 2013/0126689 A1 | 5/2013 | Richards | |

* cited by examiner

*Primary Examiner* — Alfred J Wujciak
(74) *Attorney, Agent, or Firm* — Lund IP, PLLC

(57) ABSTRACT

An assembly includes a base, a bar extending upright from the base, a bracket mounted to an end of the bar opposite the base and extending over the base. The bracket includes an outward surface facing away from the bar and over the base, the outward surface forming a protruding portion opposite the bar, a first recess on a first side of the protruding portion, and a second recess on the second side of the protruding portion. The assembly further includes a first strap segment hitched to the bracket on an opposite side of the first recess relative to the protruding portion such that the first strap segment spans the first recess; and a second strap segment hitched to the bracket on an opposite side of the second recess relative to the protruding portion such that the second strap segment spans the second recess.

20 Claims, 9 Drawing Sheets

BIG GAME STAND

TECHNICAL FIELD

This disclosure relates to display stands; and more particularly, but without limitation, display stands for photography.

BACKGROUND

Big game hunting is a popular endeavor worldwide. Many hunters enjoy memorializing a successful hunt with a photo. Common practice is to pose with a taken animal, perhaps lifting the animal's head into an upright position.

BRIEF SUMMARY

This disclosure is directed to techniques for holding the head of an antlered or horned big game animal in an upright position. A display stand as disclosed herein can hold the head of an antlered or horned animal in an upright position and be blocked from view by the body of the animal. By supporting a harvested animal in a natural position, display stands disclosed herein facilitate exceptional photographs to memorialize a successful hunt.

In one example, this disclosure is directed to an assembly including a base, a bar extending upright from the base, a bracket mounted to an end of the bar opposite the base and extending over the base. The bracket includes an outward surface facing away from the bar and over the base, the outward surface forming a protruding portion opposite the bar, a first recess on a first side of the protruding portion, and a second recess on the second side of the protruding portion, wherein the bracket, first recess and second recess resemble a curved "m" shaped. The assembly further includes a first strap segment hitched to the bracket on an opposite side of the first recess relative to the protruding portion such that the first strap segment spans the first recess; and a second strap segment hitched to the bracket on an opposite side of the second recess relative to the protruding portion such that the second strap segment spans the second recess.

In a further example, this disclosure is directed to a kit including a bar with a bracket mounted to a first end of the bar. The bracket includes an outward surface facing away from the bar, the outward surface forming a protruding portion opposite the bar, a first recess on a first side of the protruding portion, and a second recess on the second side of the protruding portion. The kit further includes a first strap segment configured to be hitched to the bracket on an opposite side of the first recess relative to the protruding portion such that the first strap segment spans the first recess, a second strap segment configured to be hitched to the bracket on an opposite side of the second recess relative to the protruding portion such that the second strap segment spans the second recess, and a base. The base includes a planar platform, an upwardly oriented tube fixed at an angle to the planar platform, the upwardly oriented tube configured to removably receive a second end of the bar, the second end of the bar being opposite the bracket, leg tubes aligned with and fixed to the planar platform, and removable legs configured for insertion in the leg tubes.

DETAILED DESCRIPTION

Figure 1:
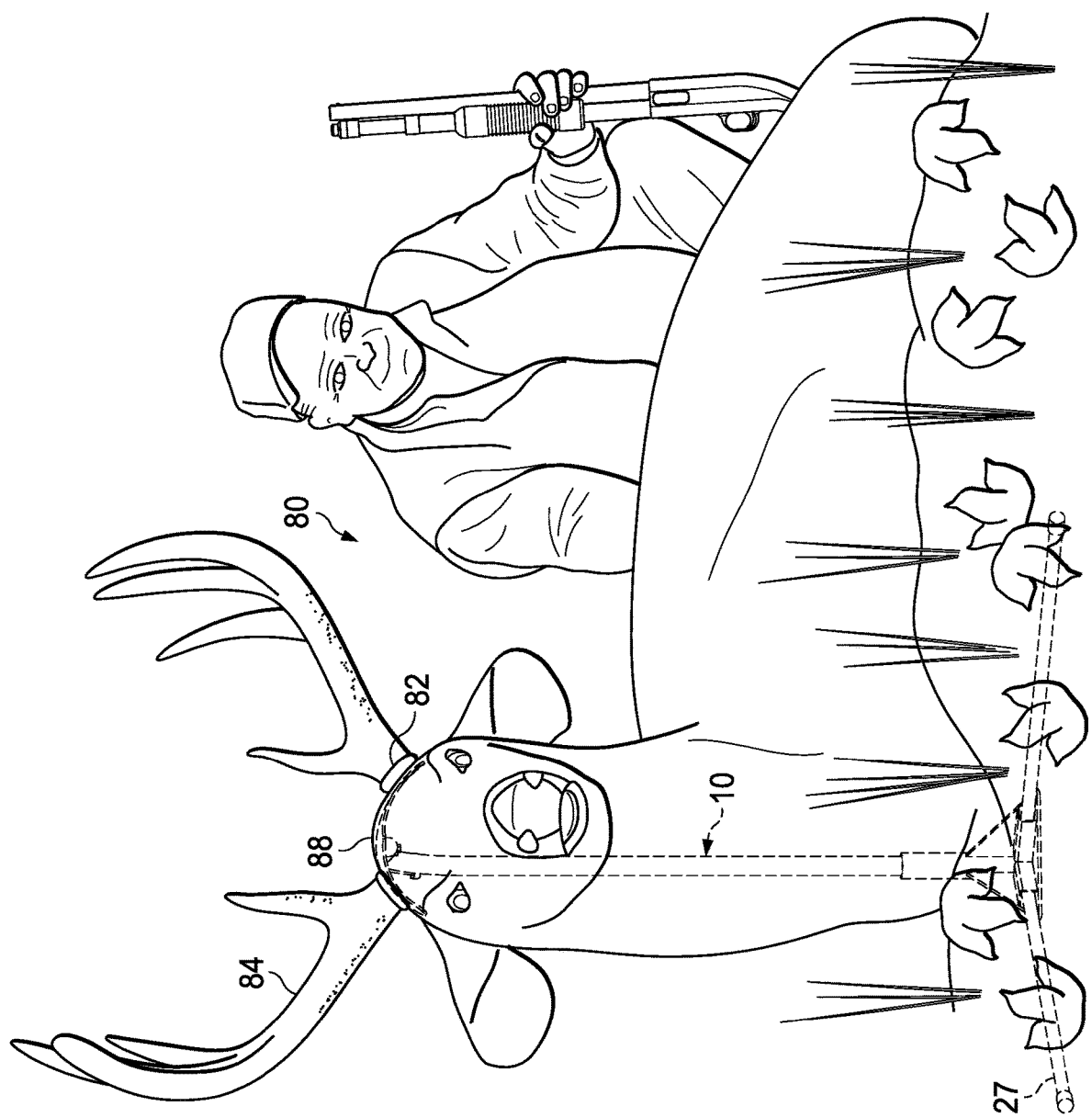
FIG. 1 illustrates a successful hunter posing with an antlered deer, a big game stand holding the head of the antlered deer upright.

FIG. 1 illustrates a successful hunter posing with an antlered deer 80, with big game stand 10 holding the head of deer 80 upright. Stand 10 is hidden from view by the body, neck, and head of deer 80. In addition, legs 27 of the base of stand 10 are hidden from view beneath ground cover, such as leaves, grass, or snow.

Figure 2A:
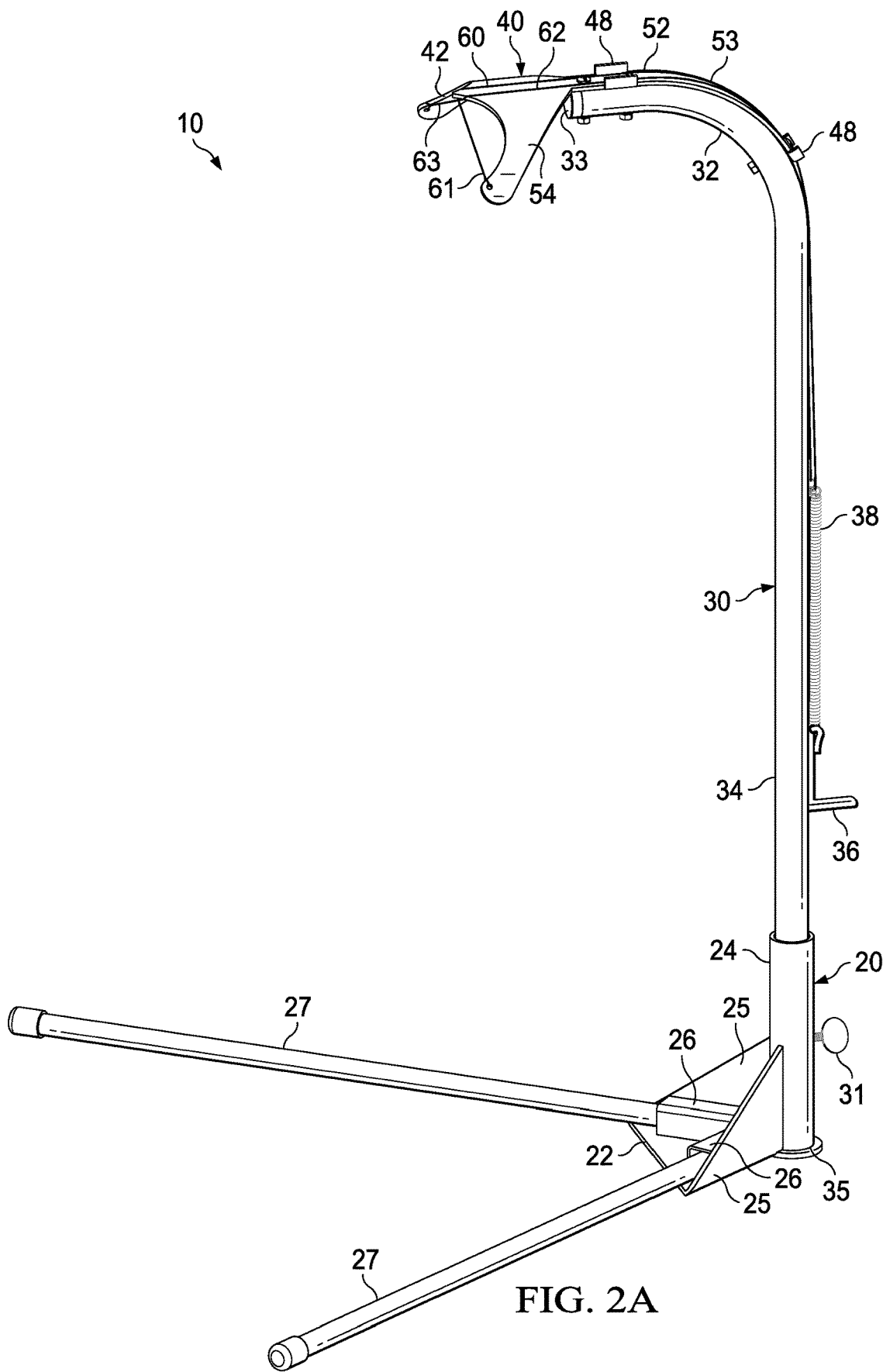
FIGS. 2A-2C illustrate the big game stand of FIG. 1.
Figure 2B:
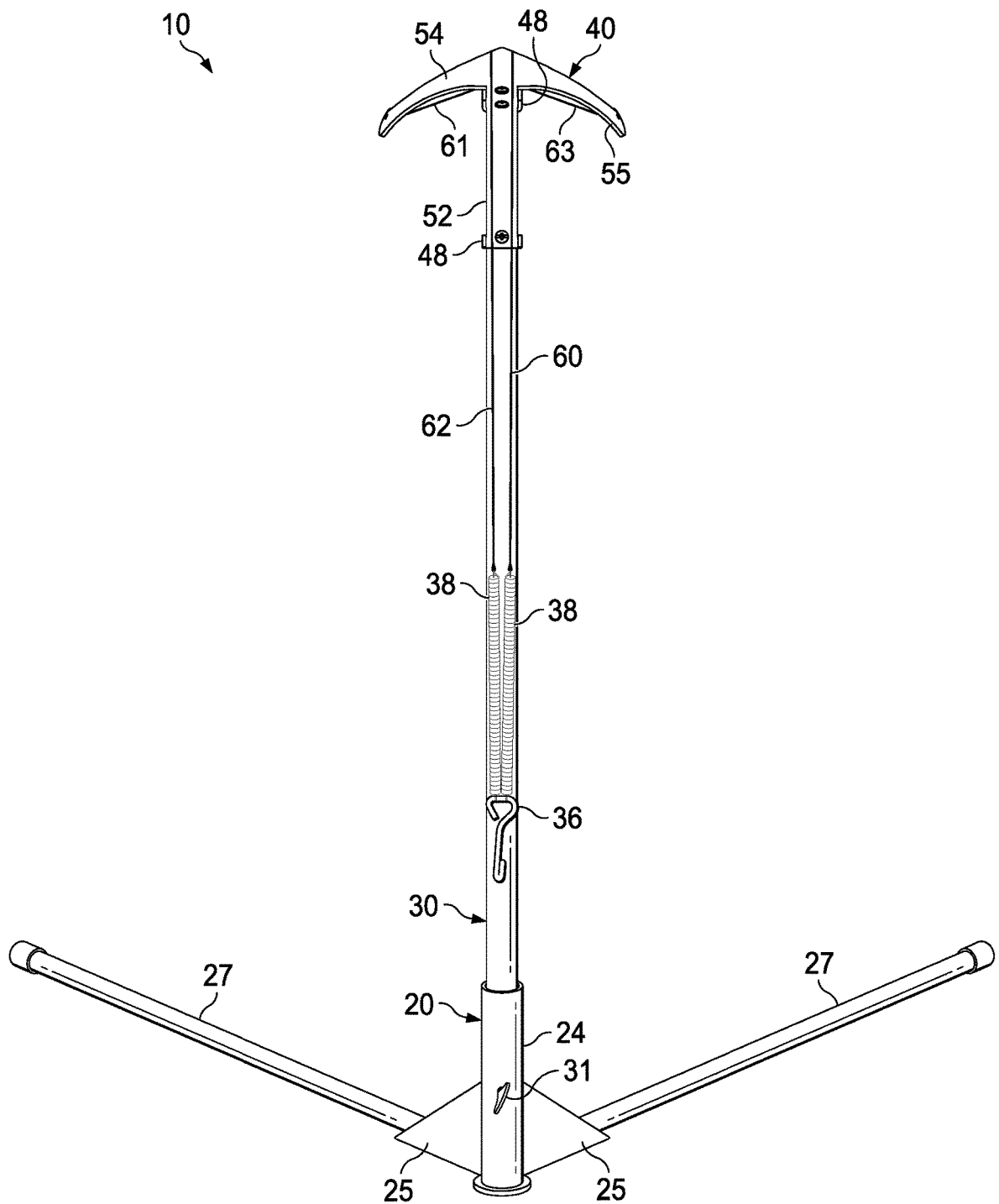
Figure 2C:
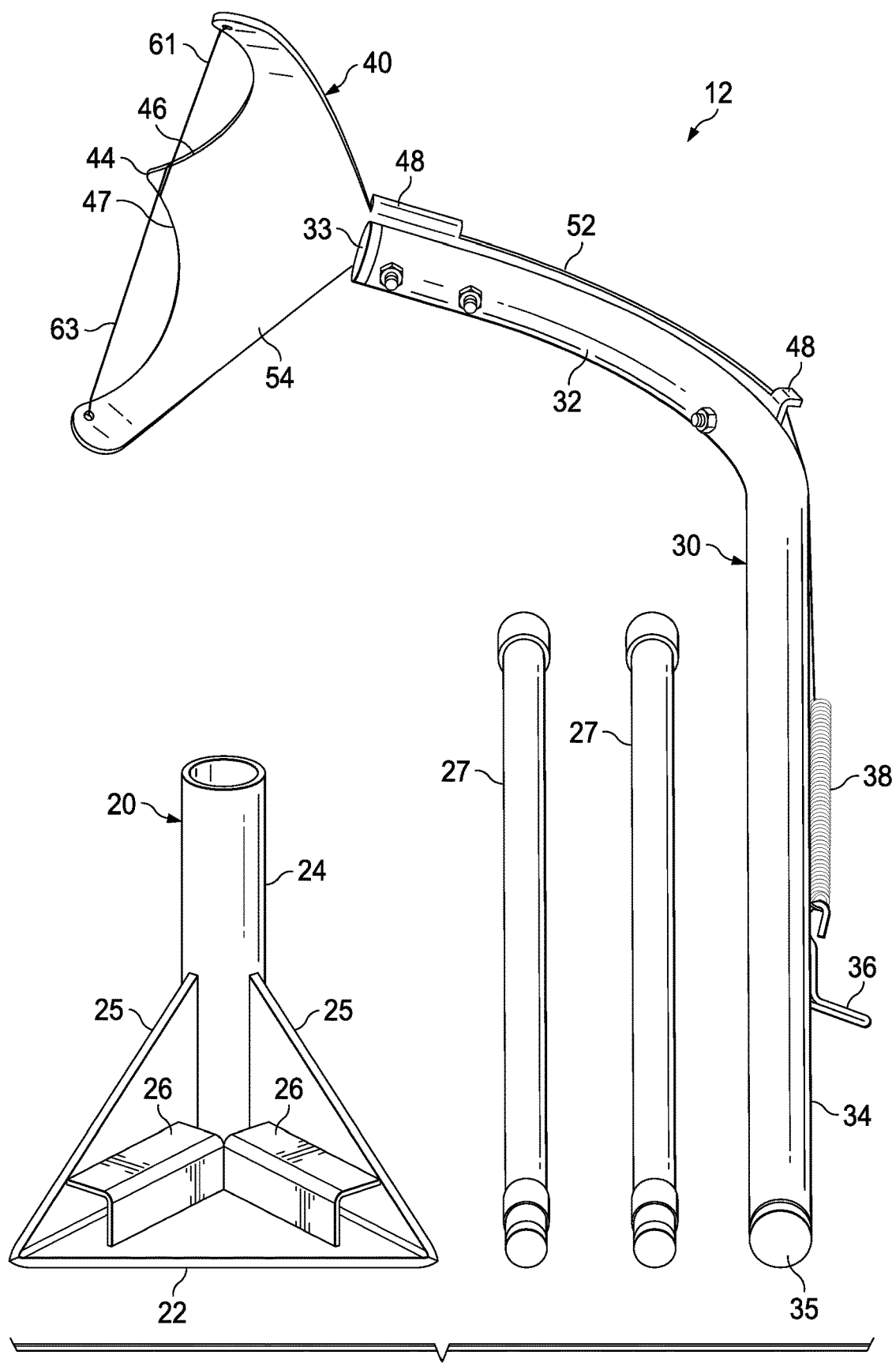

FIGS. 2A-2C illustrate big game stand 10 in further detail. Specifically, FIG. 2A is a side view of stand 10, FIG. 2B is a rear view of stand 10, and FIG. 2C shows the components of stand 10 as a kit 12 broken down for easy transport.

As shown in FIGS. 2A-2C, stand 10 is an assembly including a base 20 with removable legs 27, a bar 30 extending upright from base 20, and a bracket 40 with straps 60, 62 on the end of bar 30. Bracket 40 mounted to an end 33 of bar 30 opposite base 20 and extending over base 20. Bracket 40 includes outward surface 42 with two recesses 46, 47 configured to align with pedicles of an antlered or horned big game animal, such as pedicles 82 of deer 80 (FIG. 1). Straps 60, 62 extend over recesses 46, 47 to constrain first pedicles 82 with recesses 46, 47. In this manner, bracket 40 securely attaches to the head of an antlered or horned big game animal, while bar 30 and base 20 provide a stable frame to support the head of an antlered or horned big game animal in an upright position. Moreover, as shown in FIG. 1, the entire assembly of stand 10 may be hidden from view behind the body, neck, and head of the animal, thereby providing an opportunity to pose with the big game animal in a natural position for photographs following a successful hunt.

Base 20 includes a planar platform 22, and an upwardly oriented tube 24 fixed at an angle to planar platform 22. Tube 24 removably receives end 35 of bar 30, end 35 being opposite bracket 40. Base 20 further includes one or more gussets 25 extending between planar platform 22 and upwardly oriented tube 24. In some examples, planar platform 22 and gussets 25 are a unitary component formed from a bent plate and welded to tube 24.

Leg tubes 26 are aligned with and fixed to planar platform 22. Removable legs 27 are configured for insertion in leg tubes 26 to give base 20 a wide platform. As inserted in leg tubes 26, removable legs 27 extend outwardly and generally parallel to planar platform 22 underneath bracket 40, although the alignment of bracket 40 relative to base 20 is adjustable by turning bar 30 within tube 24. In some examples, removable legs 27 a close or interference fit within leg tubes 26. In other examples, a mechanism, such as a screw, pin, or spring clip, may be used to engage removable legs 27 with leg tubes 26.

Bar 30 includes a straight portion 34 extending upward from base 20 and a curved portion 32 extending over base 20. In the illustrated example, thumb screw 31 secures end 35 of bar 30 within tube 24, and may be used to fix the angle of bracket 40 relative to base 20. In other examples, a different mechanism, such as a pin or spring clip, may be used to secure end 35 of bar 30 within tube 24. In further examples, end 35 of bar 30 may simply provide a close or interference fit with tube 24.

Figure 3A:
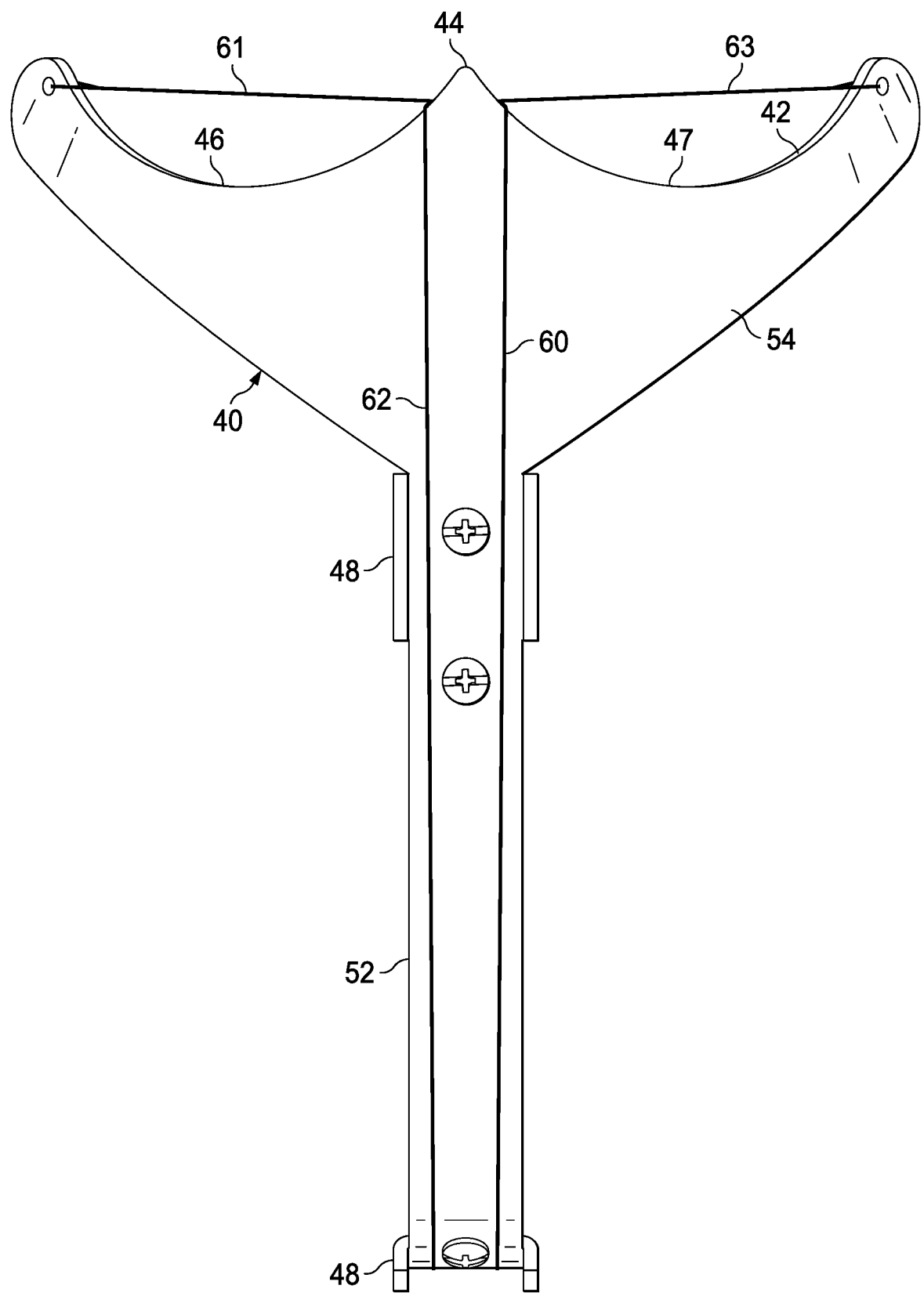
FIGS. 3A and 3B illustrate an antler bracket of the big game stand of FIG. 1.
Figure 3B:
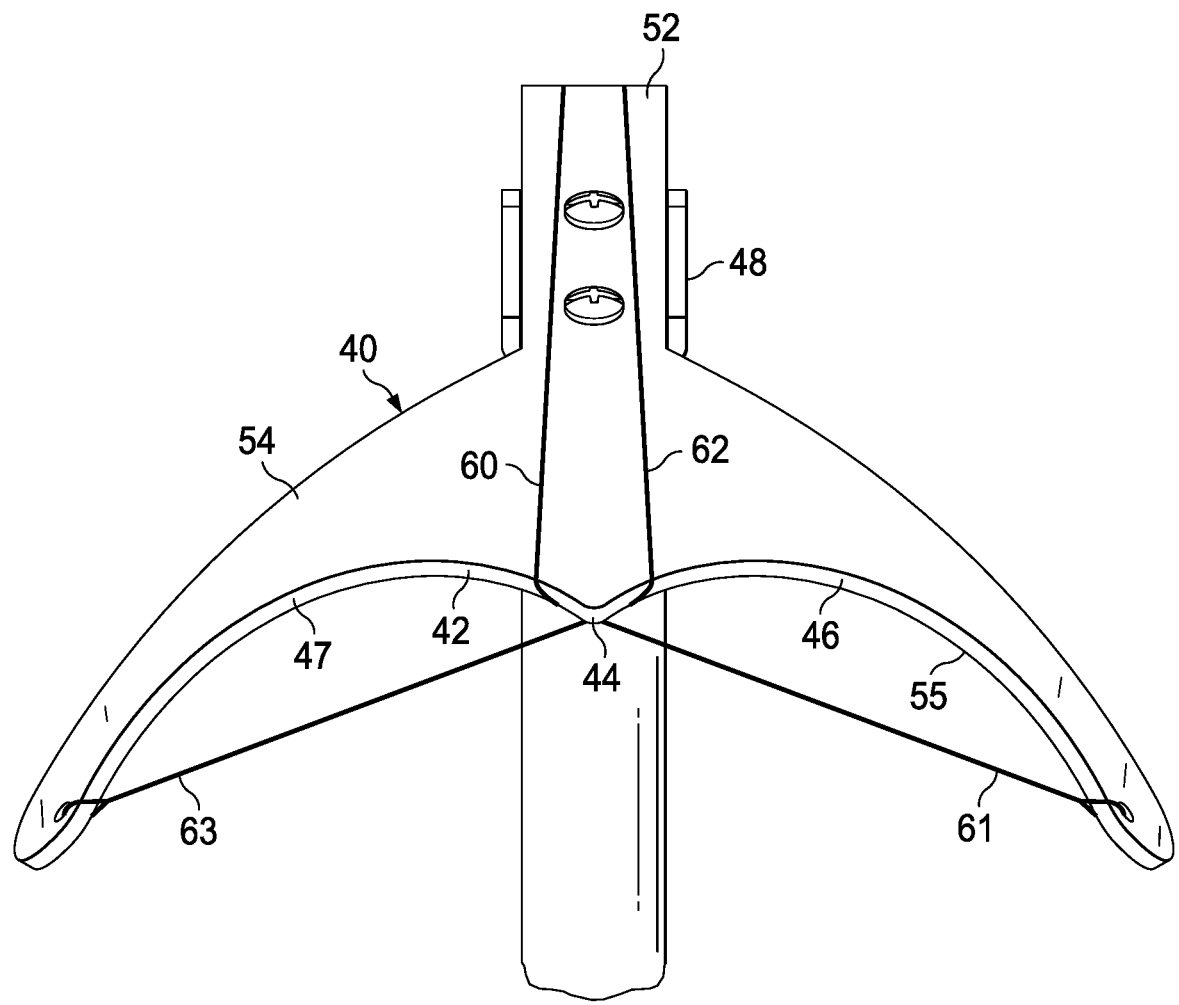

FIGS. 3A and 3B illustrate bracket 40 in further detail. Bracket 40 includes a narrowed neck 52 configured for attachment to bar 30 and a widened portion 54 forming protruding portion 44, recess 46 and recess 47. In the assembled stand 10, widened portion 54 extends over base 20, and narrowed neck 52 includes a curve 53 to align with the curved portion of bar 30.

Widened portion 54 includes an outward surface 42 facing away from bar 30 and over base 20; outward surface 42 forms protruding portion 44 opposite bar 30, recess 46 on a first side of protruding portion 44, and recess 47 on second side of protruding portion 44. Recesses 46, 47 are configured to align with pedicles of an antlered or horned big game animal, such as pedicles 82 of deer 80 (FIG. 1). Widened portion 54 also includes a curve 55 transverse to bar 30 such that opposite side of first recess 46 and opposite side of second recess 47 are each closer to base 20 than protruding portion 44. Curve 55 is designed to align with the curvature of a skull of a big game animal with recesses 46, 47 aligned with the pedicles of the animals horns or antlers.

Straps 60, 62 extend over recesses 46, 47 to constrain pedicles 82 with recesses 46, 47. In the illustrated example, strap 60 includes a strap segment 61 extending over recess 46, and strap 62 includes a strap segment 63 extending over recess 47. Strap 60 extends from bracket 40 on opposite side of recess 46 relative to protruding portion 44, around protruding portion 44 and to bar 30. Similarly, strap 62 extends from bracket 40 on opposite side of recess 47 relative to protruding portion 44, around protruding portion 44 and to bar 30. In different examples, a single strap may be routed over recesses 46, 47 to constrain pedicles 82 with recesses 46, 47. In such examples, the single strap may be hitched to protruding portion 44 between recesses 46, 47.

Strap segment 61 is configured to be hitched to bracket 40 on an opposite side of recess 46 relative to protruding portion 44 such that strap segment 61 spans recess 46. In the illustrated example, strap segment 61 is hitched to protruding portion 44 and hitched to bracket 40 on an opposite side of recess 46 relative to protruding portion 44 such that strap segment 61 spans recess 46. For example, an end of strap segment 61 may be threaded through hole 56 (FIG. 4), and strap segment 61 may be wrapped over protruding portion 44 before being routed to bar 30 as constrained by strap guides 48, which constrain straps 60, 62 between protruding portion 44 and bar 30 to facilitate route straps 60, 62 along narrowed neck 52 and bar 30. In some examples, bracket 40 includes bent tabs forming strap guides 48.

Similarly, strap segment 63 is configured to be hitched to bracket 40 on an opposite side of recess 47 relative to protruding portion 44 such that strap segment 63 spans recess 47. In the illustrated example, strap segment 63 is hitched to protruding portion 44 and hitched to bracket 40 on an opposite side of recess 47 relative to protruding portion 44 such that strap segment 63 spans recess 47. For example, an end of strap segment 61 may be threaded through hole 57 (FIG. 4), and strap segment 63 may be wrapped over protruding portion 44 before being routed to bar 30 as constrained by strap guides 48.

Strap segment 61 is releasably hitched to allow securing a first object, such as one of pedicles 82, between recess 46 and strap segment 61. Likewise, strap segment 63 is releasably hitched to allow securing a second object, such as the other of pedicles 82, between recess 47 and strap segment 63. For example, the opposite ends of straps 60, 62 may be attached to latch 36, which is releasably attached to bar 30. For example, latch 36 may include a pin that may be pushed through a hole in bar 30 to secure the opposite ends of straps 60, 62 to bar 30. In the illustrated example, springs 38 are between straps 60, 62 and latch 36. With latch engaged in bar 30, springs 38 provide tension on straps 60, 62 thereby allowing multiple size objects to be tightly secured within recesses 46, 47. In various examples, straps 60, 62 may be formed from rope, wire, solid or stranded cable, chord, elastic, rubber, chain or other flexible elongated structure. In examples in which straps 60, 62 are formed from a stretchable material, springs 38 may be omitted.

Figure 4:
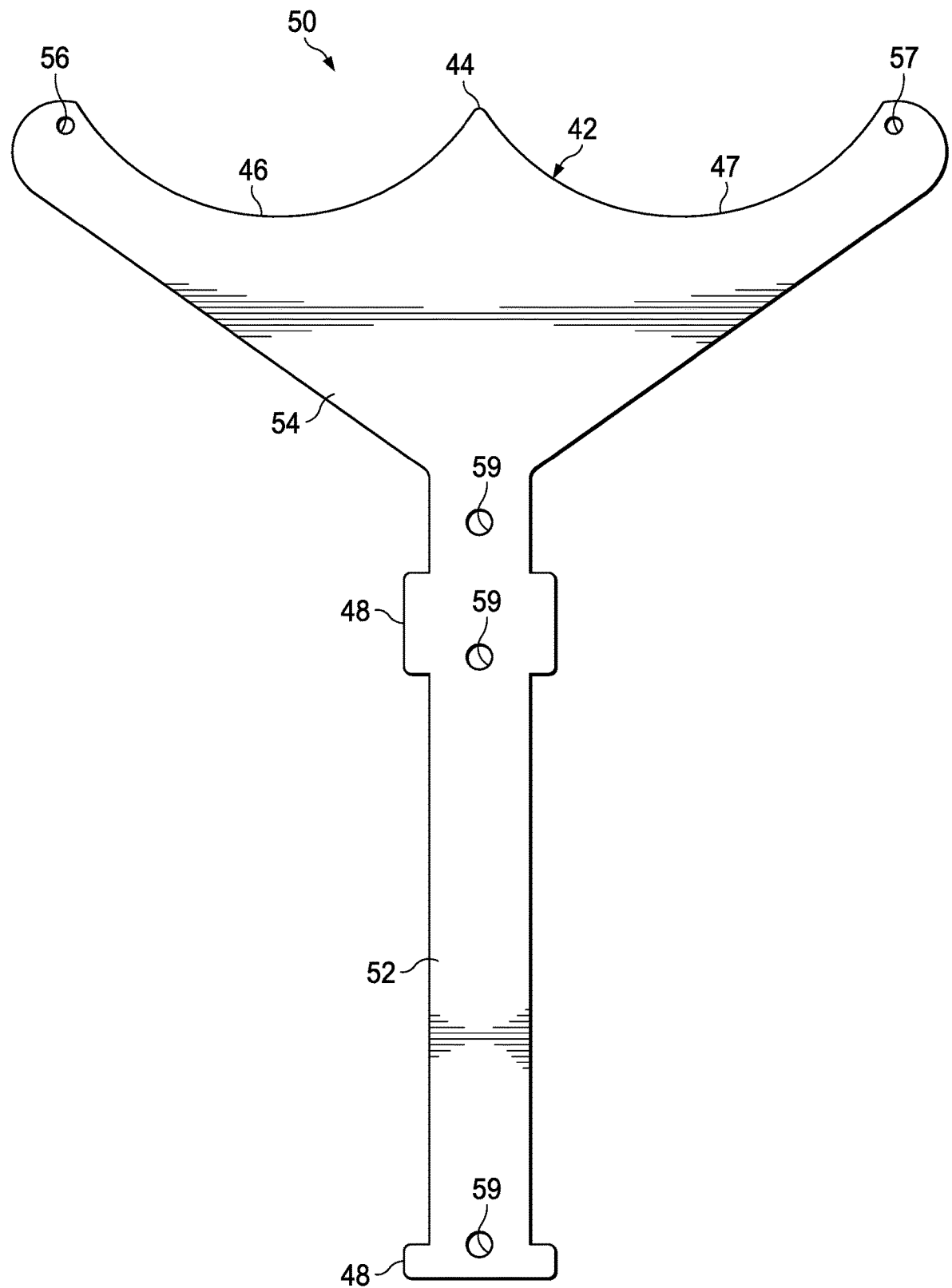
FIG. 4 illustrates the planar profile of the antler bracket of FIGS. 3A and 3B.

FIG. 4 illustrates a planar profile 50 of antler bracket 40 prior to forming curve 53 of narrowed neck 52 and curve 55 transverse to bar 30 in widened portion 54. Details of the shape of bracket 40 are best illustrated in FIG. 4.

As shown, bracket 40 defines a first curve forming recess 46, and a second curve forming recess 47. The first curve intersects second curve to form an apex of protruding portion 44.

In some examples, the first curve has a radius of one to three inches, such as 1.5 to 2 inches, such as about 1.75 inches, and the second curve has a similar radius, such as radius within 25 percent of first radius. In the same or different examples, a bottom of recess 46 may be spaced two to five inches from a bottom of recess 47. These dimensions should be selected conform to the size and shape of an antlered of big game animal, such as deer 80. Antlered or horned animals within a locality tend to have similar spaced and sized antlers or horns, such that a single size bracket 40 may be expected to fit animals targeted for a hunt. However, in some examples, a kit may include multiple brackets of various sizes to allow stand 10 to closely fit animals of different sizes.

Narrowed neck 52 includes tabs, which may be bent to form two pairs of strap guides 48. Narrowed neck 52 also includes screw holes 59 to facilitate attachment to bar 30. Bar 30 may include corresponding threaded screw holes (not shown) to receive screws attaching bracket 40 to bar 30 via screw holes 59. In other examples, bar and bracket may be attached by other techniques or permanently fixed to one another, by welding, through manufacture as a unitary component, or by other means.

Figure 5A:
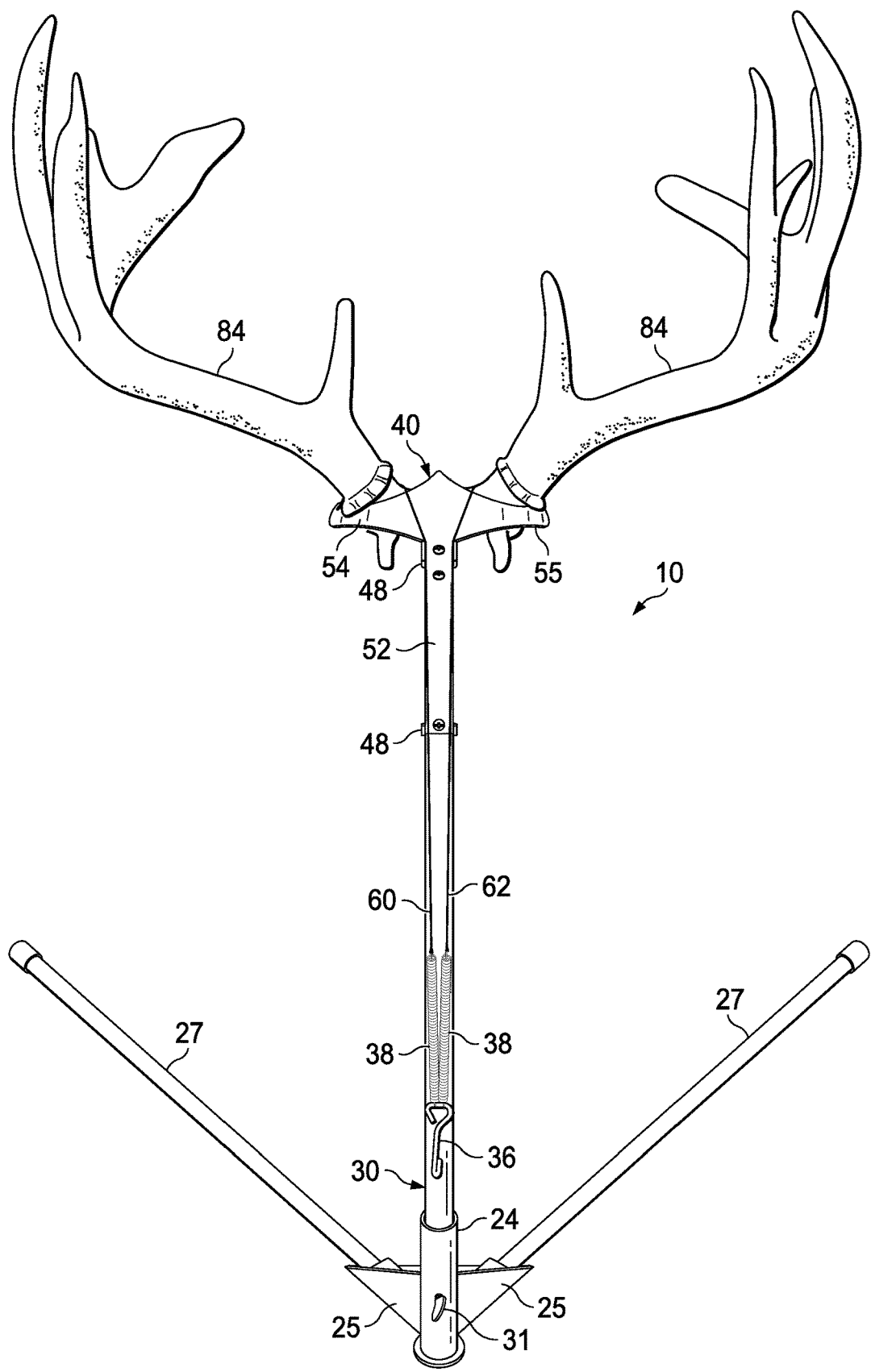
FIGS. 5A and 5B illustrate the big game stand of FIG. 1 holding the skull and antlers of a harvested deer.
Figure 5B:
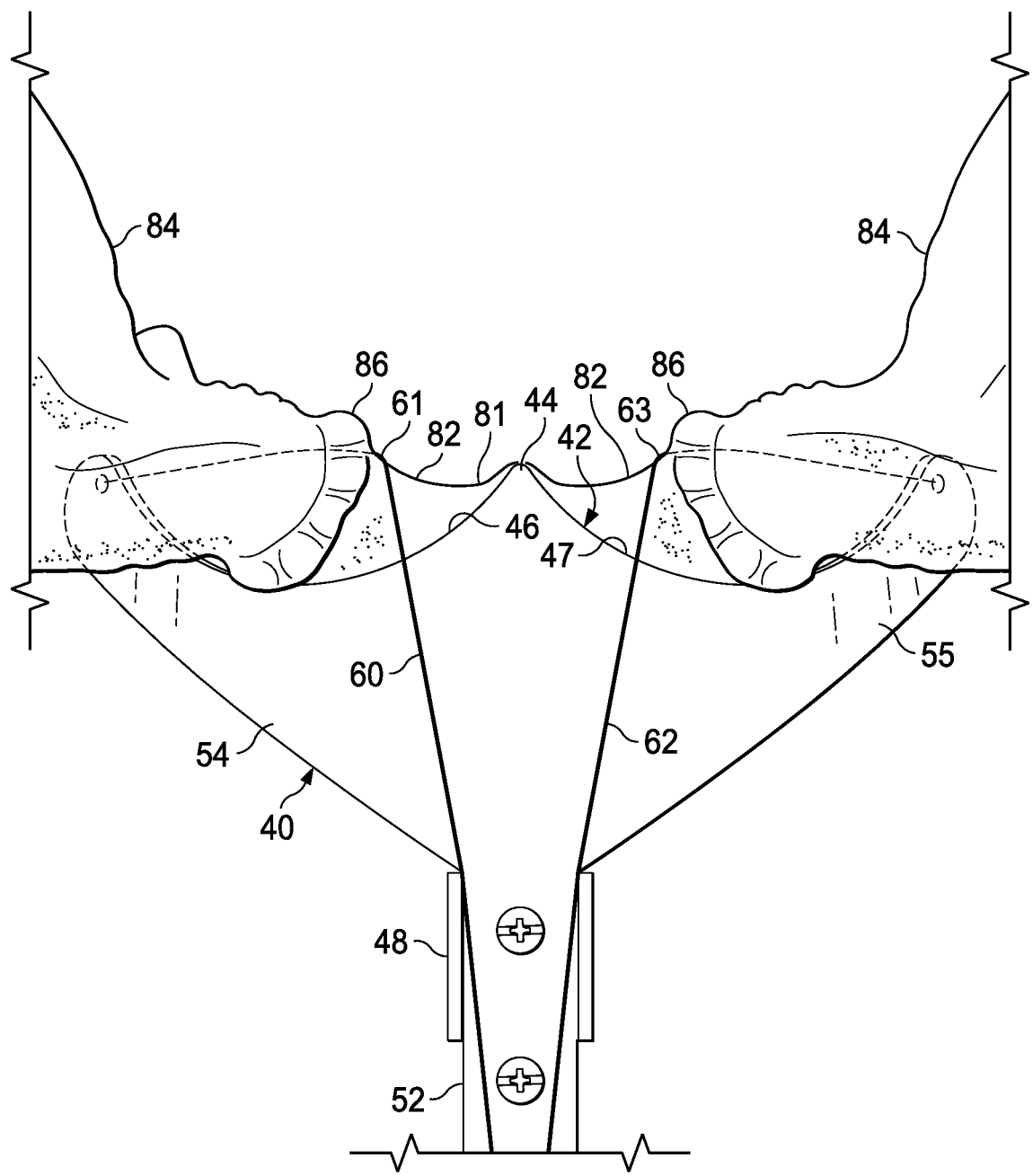

FIGS. 5A and 5B illustrate the big game stand 10 holding a portion of skull 81 with antlers 84 of deer 80, but without the rest of the head, neck or body of deer 80. FIGS. 5A and 5B are illustrate how stand 10 attaches to a full-bodied antlered or horned animal.

Stand 10 includes strap segment 61, which extends over a first pedicle 82 of a first antler 84 of a cervid between a skull 81 and a first burr 86 of first antler 84 to constrain first pedicle 82 within recess 46, and strap segment 63 extends over a second pedicle 82 of a second antler 84 of a cervid between skull 81 and a second burr 86 of second antler 84 to constrain first pedicle 82 within recess 47. In this particular example, strap segments 61, 63 are not hitched over protrusion 44, but are instead directed along narrowed neck 52 by strap guides 48. Alternatively, strap segments 61, 63 may be hitched over protrusion 44 as illustrated previously.

As shown in FIG. 1, strap segment 61 and strap segment 63 may be covered by hair of the cervid (such as hair 88 of antlered deer 80), and thereby hidden from view for a photograph.

The specific techniques holding the head of an antlered or horned big game animal in an upright position, such as techniques embodied by big game stand 10, are merely illustrative of the general inventive concepts included in this disclosure as defined by the following claims.

The invention claimed is:

1. A stand for supporting a game animal in an upright position, comprising
   a base;
   a bar extending upright from the base;
   a bracket mounted to an end of the bar opposite the base and extending over the base,
   wherein the bracket including an outward surface facing away from the bar and over the base, the outward surface forming a protruding portion opposite the bar, a first recess on a first side of the protruding portion, and a second recess on the second side of the protruding portion, wherein the bracket, first recess and second recess resemble a curved "m" shaped;
   a first strap segment hitched to one side of bracket toward the protruding portion such that the first strap segment spans the first recess; and
   a second strap segment hitched to the other side of bracket toward the protruding portion such that the second strap segment spans the second recess.

2. The assembly of claim 1,
   wherein the first strap segment is releasably hitched to allow securing a first object between the first recess and the first strap segment, and
   wherein the second strap segment is releasably hitched to allow securing a second object between the second recess and the second strap segment.

3. The assembly of claim 1,
   wherein the first strap segment is part of a first strap, the first strap extending from the bracket on the opposite side of the first recess relative to the protruding portion, around the protruding portion and to the bar, and
   wherein the second strap segment is part of a second strap, the second strap extending from the bracket on the opposite side of the second recess relative to the protruding portion, around the protruding portion and to the bar.

4. The assembly of claim 3, further comprising a latch releasably connecting the first strap and the second strap to the bar.

5. The assembly of claim 4, further comprising a spring between the latch and the first strap.

6. The assembly of claim 3, further comprising at least one strap guide constraining the first strap and the second strap between the protruding portion and the bar.

7. The assembly of claim 1, wherein the bracket includes a curve transverse to the bar such that the opposite side of the first recess and the opposite side of the second recess are each closer to the base than the protruding portion.

8. The assembly of claim 1, wherein a bottom of the first recess is spaced two to five inches from a bottom of the second recess.

9. The assembly of claim 1,
   wherein the bracket defines a first curve forming the first recess, the first curve having a first radius of one to three inches, and
   wherein the bracket defines a second curve forming the second recess, the second curve having a second radius within 25 percent of the first radius.

10. The assembly of claim 9, wherein the first curve intersects the second curve to form an apex of the protruding portion.

11. The assembly of claim 1, wherein a planar profile of the bracket includes a narrowed neck configured for attachment to the bar and a widened portion forming the protruding portion, the first recess and the second recess.

12. The assembly of claim 11, wherein the widened portion extends over the base, and the narrowed neck curves to align with the bar.

13. The assembly of claim 1, wherein the bar includes a straight portion extending upward from the base and a curved portion extending over the base.

14. The assembly of claim 1, wherein the base includes an upwardly oriented tube that removably receives the bar opposite the bracket.

15. The assembly of claim 14, wherein the base further includes a planar platform and one or more gussets extending between the planar platform and the upwardly oriented tube.

16. The assembly of claim 15, wherein the planar platform and the one or more gussets are a unitary component formed from a bent plate.

17. The assembly of claim 1, wherein the base includes a planar platform, and removable legs extending outwardly and generally parallel to the planar platform underneath the bracket.

18. The assembly of claim 1, further comprising a cervid,
   wherein the first strap segment extends over a first pedicle of a first antler of the cervid between a skull of the cervid and a first burr of the first antler to constrain the first pedicle within the first recess, and
   wherein the second strap segment extends over a second pedicle of a second antler of the cervid between the skull and a second burr of the second antler to constrain the second pedicle within the second recess.

19. The assembly of claim 18, wherein the first strap segment and the second strap segment are covered by hair of the cervid.

20. A kit for supporting a game animal in an upright position, comprising:
   a bar with a bracket mounted to a first end of the bar,
   wherein the bracket includes an outward surface facing away from the bar, the outward surface forming a protruding portion opposite the bar, a first recess on a first side of the protruding portion, and a second recess on the second side of the protruding portion, wherein the bracket, first recess and second recess resemble a curved "m" shaped;
   a first strap segment configured to be hitched to the one side of bracket toward the protruding portion such that the first strap segment spans the first recess;
   a second strap segment configured to be hitched to the other side of bracket toward the protruding portion such that the second strap segment spans the second recess; and
   a base including:
      a planar platform;
      an upwardly oriented tube fixed at an angle to the planar platform, the upwardly oriented tube configured to removably receive a second end of the bar, the second end of the bar being opposite the bracket;
      leg tubes aligned with and fixed to the planar platform; and
      removable legs configured for insertion in the leg tubes.

* * * * *